United States Patent [19]
Wood et al.

[11] Patent Number: 5,575,509
[45] Date of Patent: Nov. 19, 1996

[54] VACUUM CLEANER HOSE ASSEMBLY, A FLEXIBLE HOSE THEREFOR AND METHODS OF MAKING THE SAME

[75] Inventors: Keith E. Wood, Asheville; R. Dale Medford; Larry D. Rathbone, both of Waynesville, all of N.C.

[73] Assignee: Dayco Products, Inc., Dayton, Ohio

[21] Appl. No.: 408,464

[22] Filed: Mar. 22, 1995

[51] Int. Cl.$^6$ .................................................. F16L 21/00
[52] U.S. Cl. ........................... 285/7; 285/280; 285/903; 264/299; 29/450; 29/890; 29/14
[58] Field of Search .................... 285/7, 275, 280, 285/281, 903, 423; 264/299; 29/450, 890.14

[56] References Cited

U.S. PATENT DOCUMENTS

| | | | |
|---|---|---|---|
| 4,345,805 | 8/1982 | Finley et al. | 285/903 X |
| 4,558,889 | 12/1985 | Gans | 285/7 |
| 4,625,998 | 12/1986 | Draudt et al. | 285/903 X |
| 4,747,621 | 5/1988 | Gans et al. | 285/903 X |

FOREIGN PATENT DOCUMENTS 2125501  3/1984  United Kingdom .................... 285/903

OTHER PUBLICATIONS

Prior known cuff end of flexible vacuum cleaner hose as illustrated in FIGS. 1–7 of this patent application.

*Primary Examiner*—Dave W. Arola
*Attorney, Agent, or Firm*—Joseph V. Tassone

[57] ABSTRACT

A vacuum cleaner hose assembly, a flexible hose therefor and methods of making the same are provided, the hose assembly comprising a flexible hose having a cuff end and a tubular tool part having an end telescoped in the cuff end and being locked therein while being rotatable relative thereto, the cuff end having a pair of axially spaced apart and inwardly directed annular convolutions provided with like facing sides, the end of the tool part having a pair of axially spaced apart and outwardly directed annular shoulders respectively engaging the sides of the annular convolutions to tend to lock the end of the tool part in the cuff end of the hose, the cuff end of the hose having an annular structure interconnecting the pair of convolutions together, the annular structure of the cuff end of the hose being annularly spaced outwardly from the tool part so as to be out of engagement therewith from one of the convolutions to the other of the convolutions.

12 Claims, 8 Drawing Sheets

VACUUM CLEANER HOSE ASSEMBLY, A FLEXIBLE HOSE THEREFOR AND METHODS OF MAKING THE SAME

BACKGROUND OF THE INVENTION

1. Field of the Invention

This invention relates to a new vacuum cleaner hose assembly and to a new flexible hose therefor as well as to a new method of making such a vacuum cleaner hose assembly and to a new method of making such a flexible hose therefor.

2. Prior Art Statement

It is known to provide a vacuum cleaner hose assembly comprising a flexible hose having a cuff end, and a tubular tool part having an end telescoped in the cuff end and being locked therein while being rotatable relative thereto, the cuff end having a pair of axially spaced apart and inwardly directed annular convolutions provided with like facing sides, the end of the tool part having a pair of axially spaced apart and outwardly directed annular shoulder means respectively engaging the sides of the annular convolutions to tend to lock the end of the tool part in the cuff end of the hose, the cuff end of the hose having an annular structure interconnecting the pair of convolutions together, the annular structure of the cuff end of the hose engaging the tool part between one of the convolutions and the other of the convolutions. For example, see FIGS. 1–7 of this application.

SUMMARY OF THE INVENTION

It is one of the features of this invention to provide a new flexible hose for a vacuum cleaner assembly wherein the cuff end of the hose will provide the proper locking function with a tubular tool part of the assembly that is telescopically disposed in the cuff end of the hose and still permit rotation of that tubular tool part relative to the cuff end of the hose.

In particular, it was found according to the teachings of this invention that the annular structure of the cuff end of the hose that interconnects the pair of locking convolutions thereof together should be formed so as to be out of engagement with the tool part when that tool part has its end telescoped into the cuff end of the hose.

This was found to be particularly a problem when the outside diameter of a blow molded vacuum cleaner stretch hose has its diameter reduced from approximately 1.8 inches to approximately 1.6 inches since a greater amount of mold material is required from the extruder to fill the stretch block convolutions making such smaller diameter hose so that when the cuff block passes the extruder, there is more mold material than the cuff block needs so that the extruded material gets thicker in the cuff end. This increased thickness in the cuff end is not always a uniform thickness and becomes unpredictable. If the thickness of the mold material becomes too great in some areas, the mold material will not set up before reaching the diaphragms of the extruder and the diaphragms will then attempt to move some of the thick material and cause "drag" or additional nonuniform sections. The "drag" or uneven sections can cause the end of the telescoped tool part to be hard to rotate in the cuff end of the hose and cause a nonuniform tool pullout force from that cuff end of the vacuum cleaner hose.

However, it has been found according to the teachings of this invention that when forming the cuff end of the hose, that annular structure should be formed in such a manner that the same will be out of engagement with the end of the tubular tool part when that end is telescoped within the cuff end of the hose and this allows the mold material to fill the mold with a more uniform thickness and yet not be too thick and cause "drag" problems so that the tool turn is much more uniform and the tool pullout force is far more predictable.

For example, one embodiment of this invention comprises a vacuum cleaner hose assembly comprising a flexible hose having a cuff end, and a tubular tool part having an end telescoped in the cuff end and being locked therein while being rotatable relative thereto, the cuff end having a pair of axially spaced apart and inwardly directed annular convolutions provided with like facing sides, the end of the tool part having a pair of axially spaced apart and outwardly directed annular shoulder means respectively engaging the sides of the annular convolutions to tend to lock the end of the tool part in the cuff end of the hose, the cuff end of the hose having an annular structure interconnecting the pair of convolutions together, the annular structure of the cuff end of the hose being annularly spaced outwardly from the tool part so as to be out of engagement therewith from one of the convolutions to the other of the convolutions.

Accordingly, it is an object of this invention to provide a new vacuum cleaner hose assembly having one or more of the novel features of this invention as set forth above or hereinafter shown or described.

Another object of this invention is to provide a new method of making such a vacuum cleaner hose assembly, the method of this invention having one or more of the novel features of this invention as set forth above or hereinafter shown or described.

Another object of this invention is to provide a new flexible vacuum cleaner hose for such a vacuum cleaner hose assembly, the flexible vacuum cleaner hose of this invention having one or more of the novel features of this invention as set forth above or hereinafter shown or described.

Another object of this invention is to provide a new method of making such a flexible vacuum cleaner hose, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figures 1, 2:
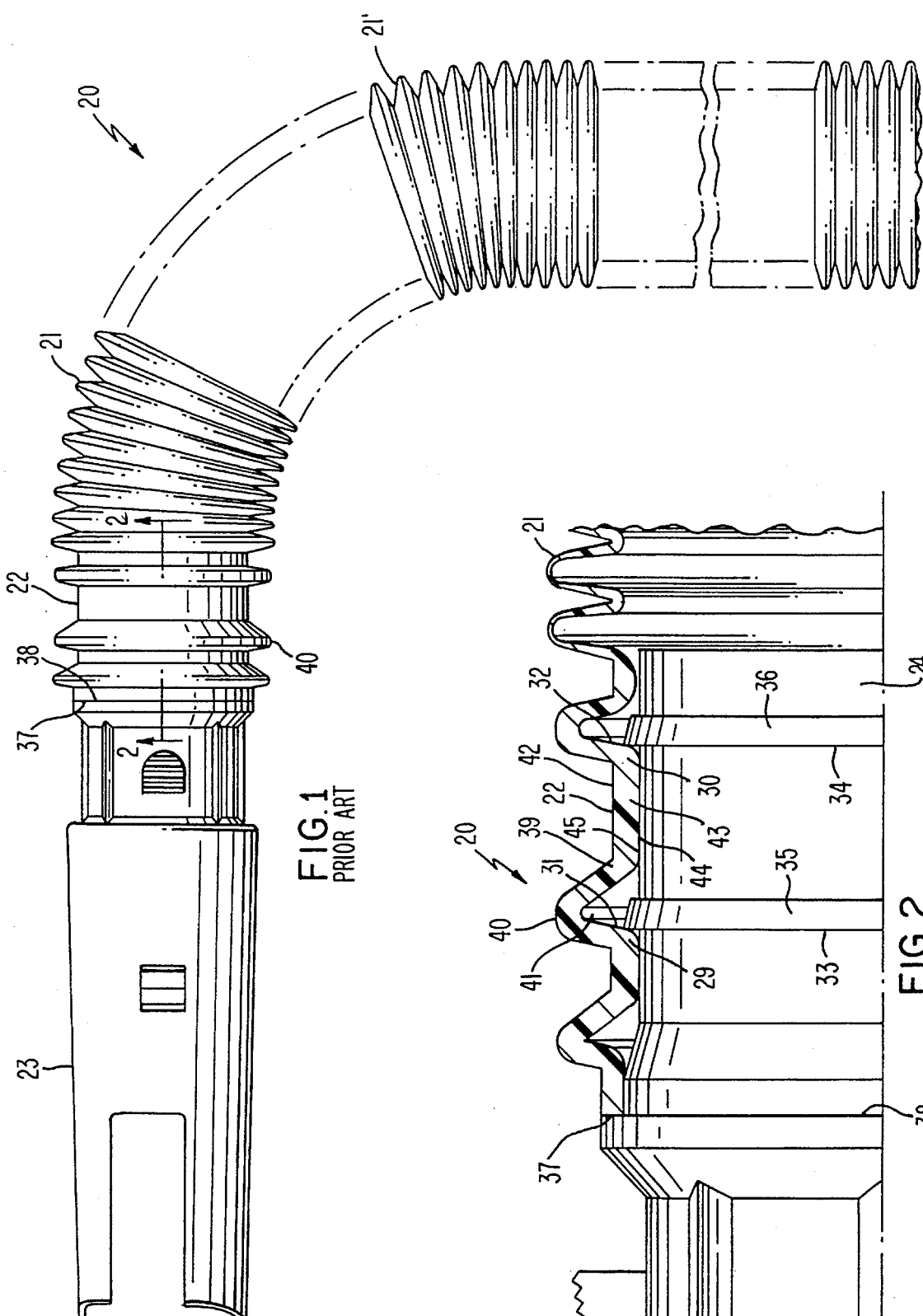
FIG. 1 is a fragmentary side view of a prior known vacuum cleaner hose assembly.
FIG. 2 is an enlarged fragmentary cross sectional view taken on line 2—2 of FIG. 2.
Figure 3:
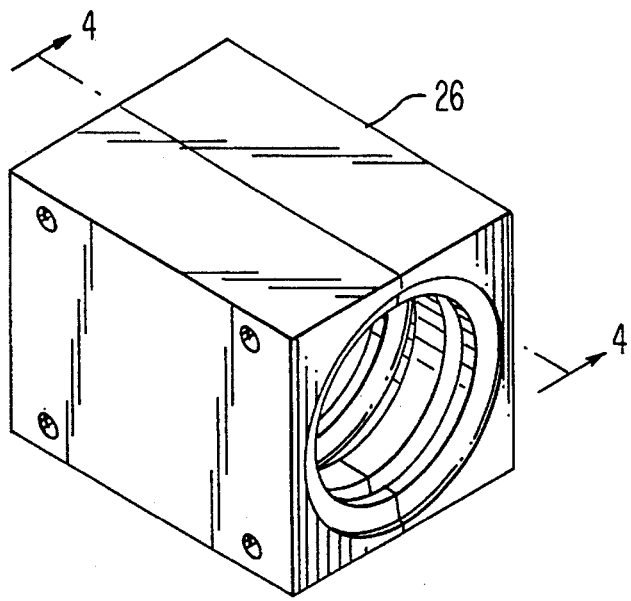
FIG. 3 is a reduced perspective view that illustrates the die block for forming the cuff end of the prior known flexible vacuum cleaner hose of the assembly of FIGS. 1 and 2.
Figure 4:
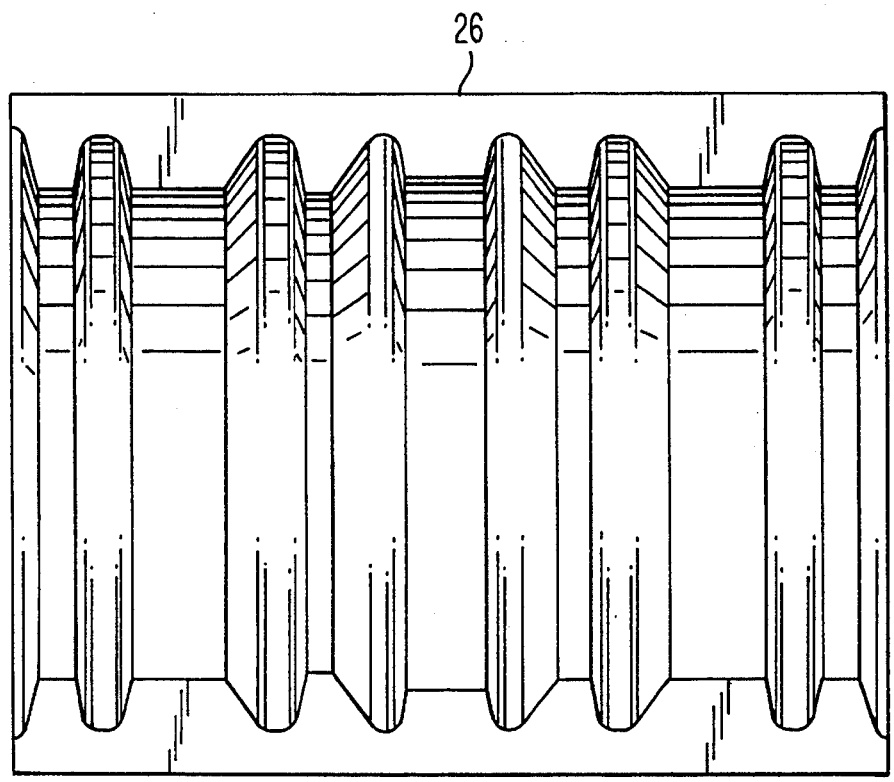
FIG. 4 is an enlarged cross-sectional view taken on line 4—4 of FIG. 3.

While the various features of this invention are hereinafter illustrated and described as providing a flexible vacuum cleaner hose to be utilized in combination with a tubular tool part having a particular configuration, it is to be understood that the various features of this invention can be utilized singly or in various combinations thereof to provide a flexible vacuum cleaner hose that can be utilized with structure other than the particular tubular tool part illustrated in the drawings.

Therefore, this invention is not be limited to only the embodiment illustrated in the drawings, because the drawings are merely utilized to illustrate one of the wide variety of uses of this invention.

Figure 7:
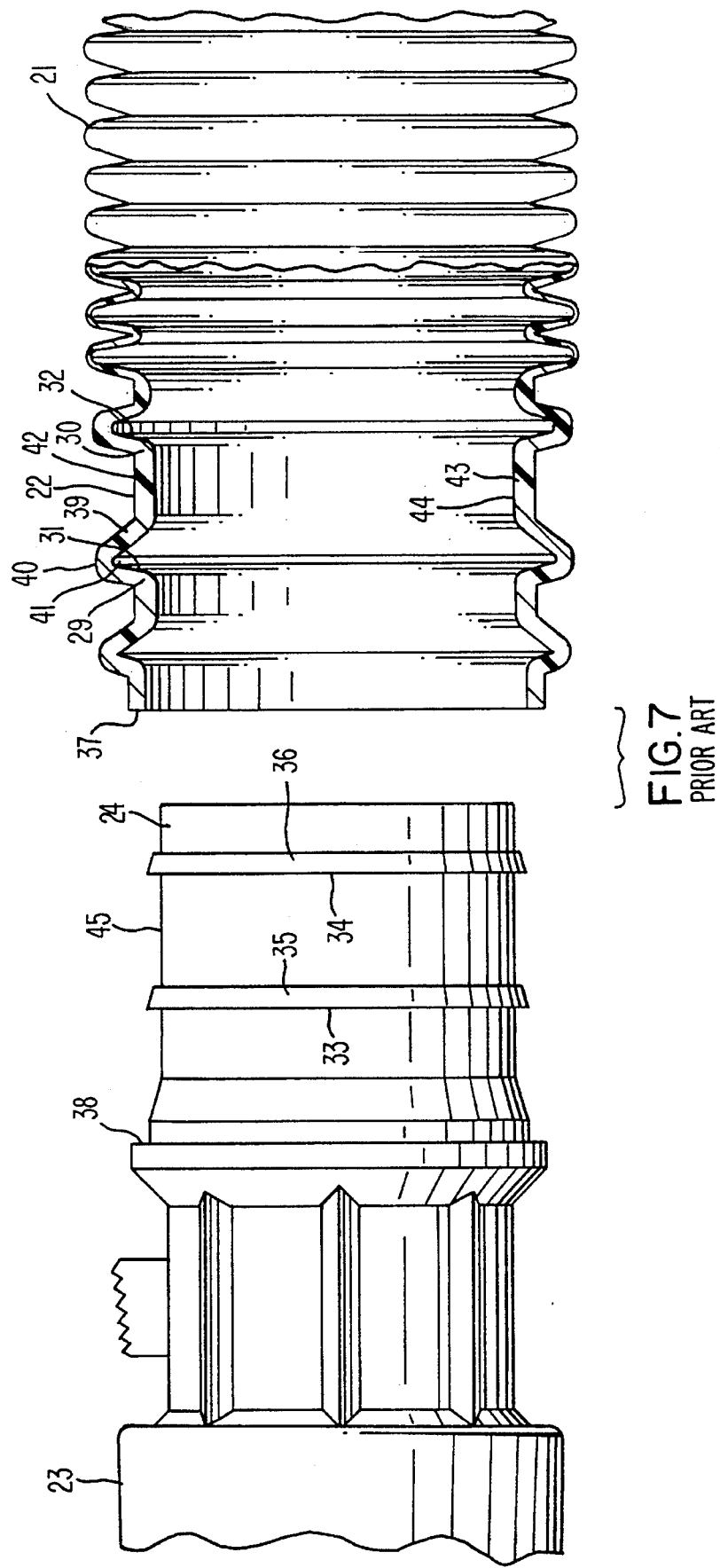
FIG. 7 is a fragmentary side view illustrating the parts of the hose assembly of FIGS. 1 and 2 in their separated condition, the flexible vacuum cleaner hose being shown in cross section and the tool part being shown in elevation.

Referring now to FIGS. 1, 2 and 7, the prior known vacuum cleaner hose assembly is generally indicated by the reference numeral 20 and comprises a flexible vacuum cleaner hose 21 having a cuff end 22 and a tubular tool part 23 having an end 24 telescoped in the cuff end 22 and being locked therein while being rotatable relative thereto. However, when applying sufficient pullout axial force, the tool part 23 can have the end 24 thereof removed from the cuff end 22 of the flexible hose 21, such as with a cuff pulloff force of approximately fifteen pounds.

The flexible vacuum cleaner hose has a plurality of like convolutions 21' between the opposite ends thereof and each opposite end can be formed to have a cuff end 22 for cooperating with a tool part 23, the tool part 23 being used to interconnect the hose assembly 20 to any suitable structure, such as to the vacuum cleaner housing, to a tool that is to engage against the floor, etc., all in a manner well known in the art.

Figure 5:
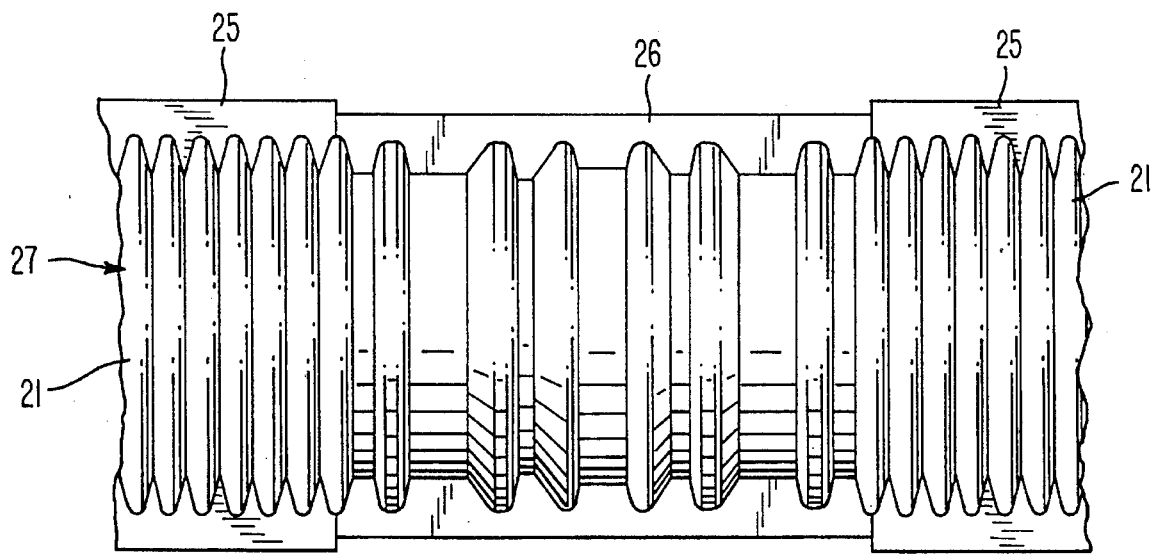
FIG. 5 is a reduced view similar to FIG. 4 and illustrates the cuff block in its assembled relation with stretch hose blocks on each side thereof for forming the flexible vacuum cleaner hose of FIGS. 1 and 2, FIG. 5 illustrating in elevation the mold material that has been extruded into the die blocks of FIG. 5 and that forms a blow molded flexible hose structure.
Figure 6:
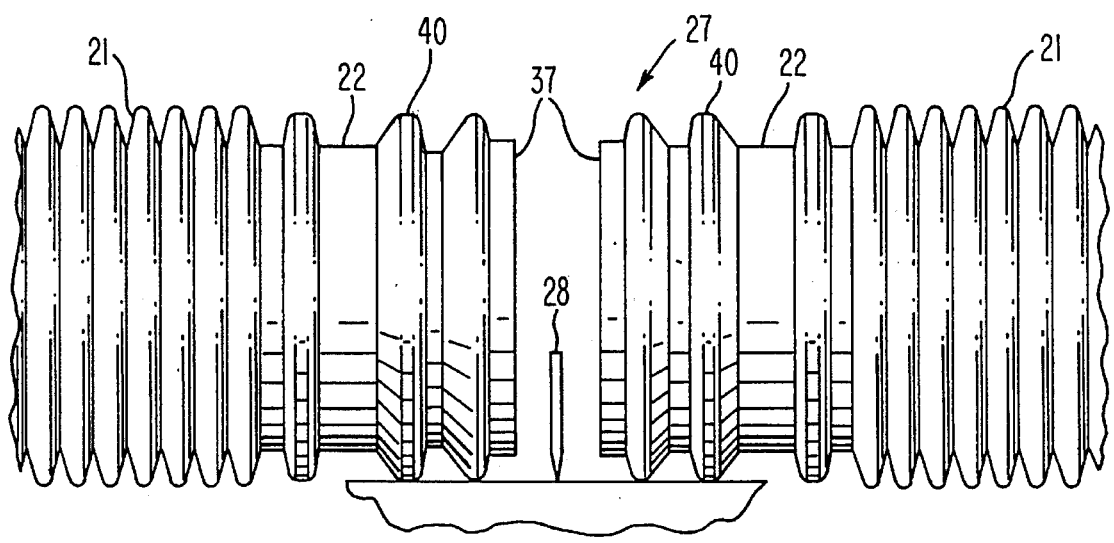
FIG. 6 is a view similar to FIG. 5 and illustrates how the blow molded flexible hose structure formed with the blocks of FIG. 5 has been subsequently removed therefrom and is cut to form two separate flexible vacuum cleaner hoses.

The flexible vacuum cleaner hose 21 is formed by blow molding suitable extrudable polymeric material, such as ethylene vinyl acetate copolymer, into a series of die blocks 25, FIG. 5, in a manner well known in the art and at the end of a series of such die blocks 25 for the vacuum cleaner hose 21, a cuff block 26 is provided and is utilized to form a cuff end 22 on the trailing end of a vacuum cleaner hose 21 as well as a cuff end on the leading end of the next adjacent flexible vacuum cleaner hose 21. Thus, it can be seen that the die block 26 in FIG. 5 is disposed intermediate to hose blocks 25 all in a manner well known in the art so that when a subsequent blow molding operation takes place from the extruder (not shown), the resulting molded structure 27 illustrated in FIG. 6 and having been removed from the die structure illustrated in FIG. 5 can be cut in half by suitable cutter means 28 to form two like vacuum cleaner hoses 21 respectively having cuff ends 22 as illustrated in FIG. 6 at the opposite ends thereof.

The use of two-part die blocks for forming flexible corrugated vacuum cleaner hoses are well known in the art. For example, see the U.S. Patent to Davidson et al, U.S. Pat. No. 3,402,429 and the U.S. Patent to Gans et al, U.S. Pat. No. 4,756,045 whereby these two U.S. patents are being incorporated into this disclosure by this reference thereto.

Therefore, since the structure for extruding polymeric material to form a flexible hose construction are well known in the art only the structure of the vacuum cleaner hose assembly necessary to understand the features of this invention will now be described.

The cuff end 22 of the prior known flexible vacuum cleaner hose 21 has a pair of spaced apart annular convolutions 29 and 30 having like facing sides 31 and 32 which form locking surfaces with outwardly directed annular shoulder means 33 and 34 formed in spaced apart relation on the end 24 of the tool 23 so as to "lock" the end 24 of the tool 23 in its telescoped relation in the cuff end 22 of the hose 21, the annular shoulders 33 and 34 respectively joining annular beveled camming surfaces 35 and 36 formed on the end 24 of the tool part 23 to facilitate the insertion of the end 24 of the tool part 23 into the cuff end 22 of the hose 21 when the same is moved relative to the cuff end 22 of the hose 21 in the telescoping assembling operation in a manner well known in the art.

The cuff end 22 of the flexible hose 21 has an end edge means 37 that will abut against an annular shoulder 38 on the tool part 23 when the end 24 is disposed in its locking condition illustrated in FIG. 2 whereby the tool part 23 is adapted to be rotated relative to the cuff end 22 in its "locked" condition therewith and the facing sides 31 and 32 of the convolutions 29 and 30 on the cuff end 22 of the flexible hose 21 prevent the end 24 of the tool part 23 from being pulled out of the cuff end 22 except when a relatively large axial pullout force is applied thereto as previously set forth.

As illustrated in FIGS. 2 and 7, the cuff end 22 of the flexible hose 21 has an annular structure 39 that interconnects the inwardly directed annular convolutions 29 and 30 together, the annular structure 39 comprising an outwardly directed annular convolution 40 that has a side 41 that joins with the side 31 of the inwardly directed annular convolution 29 and has an inwardly directed annular convolution 42 that has a substantially flat and long apex 43 that joins with the inwardly directed convolution 30. The relatively long annular apex 43 of the inwardly directed annular convolution 42 has an inner annular surface 44 that engages against an external annular peripheral surface 45 of the end 24 of the tool part 23 for a relatively long distance between the annular shoulder means 33 and 34 thereof as illustrated in FIG. 2.

As previously stated, the engagement of the surface 44 of the inwardly directed convolution 42 will form a dragging action on the surface 45 of the end 24 of the tool part 23 and thereby tend to retard rotational movement of the tool part 23 relative to the cuff end 22 of the flexible hose 21.

In the blow molding operation of FIG. 5, the extruder will tend to lay more material on the leading slope of the convolution or towards the leading slope. Therefore, the trailing cuff will have a tendency to accumulate additional material in the barrel area between the two latches 29 and 30 and therefore will keep the rear latch 30 from being effective. The leading cuff is the last cuff off of any given hose to pass the extrusion head. A trailing cuff of the next hose is contained in the same holding block immediately behind the leading cuff. This condition stems from the block designation wherein the lead end of a block is the first portion of the block to pass the extrusion die. Each hose is composed of moldable blocks plus one cuff block, half of which is on each end of the hose. The attempt is to make the wall thickness uniform throughout the area of the cuff end 22 in order that the cuff end 22 does not drag in the diaphragm area of the extruder which causes a roughened surface on the inside diameter of the cuff which in turn causes drag on the barrel of the tool insert. If the mold material on one side of the latch is too thin, the latch will pull out too easily and if too thick will cause the latch to drag. So a balance is sought between the amount of mold material in the latch in order to provide the proper pulloff specification but to make the latch and barrel diameter large enough that no drag occurs against the tool insert when the tool insert is rotated inside the cuff area. If the mold material in any one of the upturned areas is too thin, then the cuff area tends to collapse axially when the insert is placed into the cuff end. When this balance is struck, the pulloff readings are very uniform. Dragging generally occurs at a wall gauge of approximately 0.80 of an inch.

Accordingly, it was found according to the teachings of this invention that the annular structure 39 of the cuff end 22 should be modified in the manner illustrated in FIGS. 8–14 in order to reduce any drag attempt on the end 24 of the tool part 23.

Therefore, reference is now made to FIGS. 8–14 wherein the new vacuum cleaner hose assembly of this invention is generally indicated by the reference number 20A and parts thereof similar to the parts of the hose assembly 20 previously described are indicated by like reference numerals followed by the reference letter "A".

Figures 8, 9:
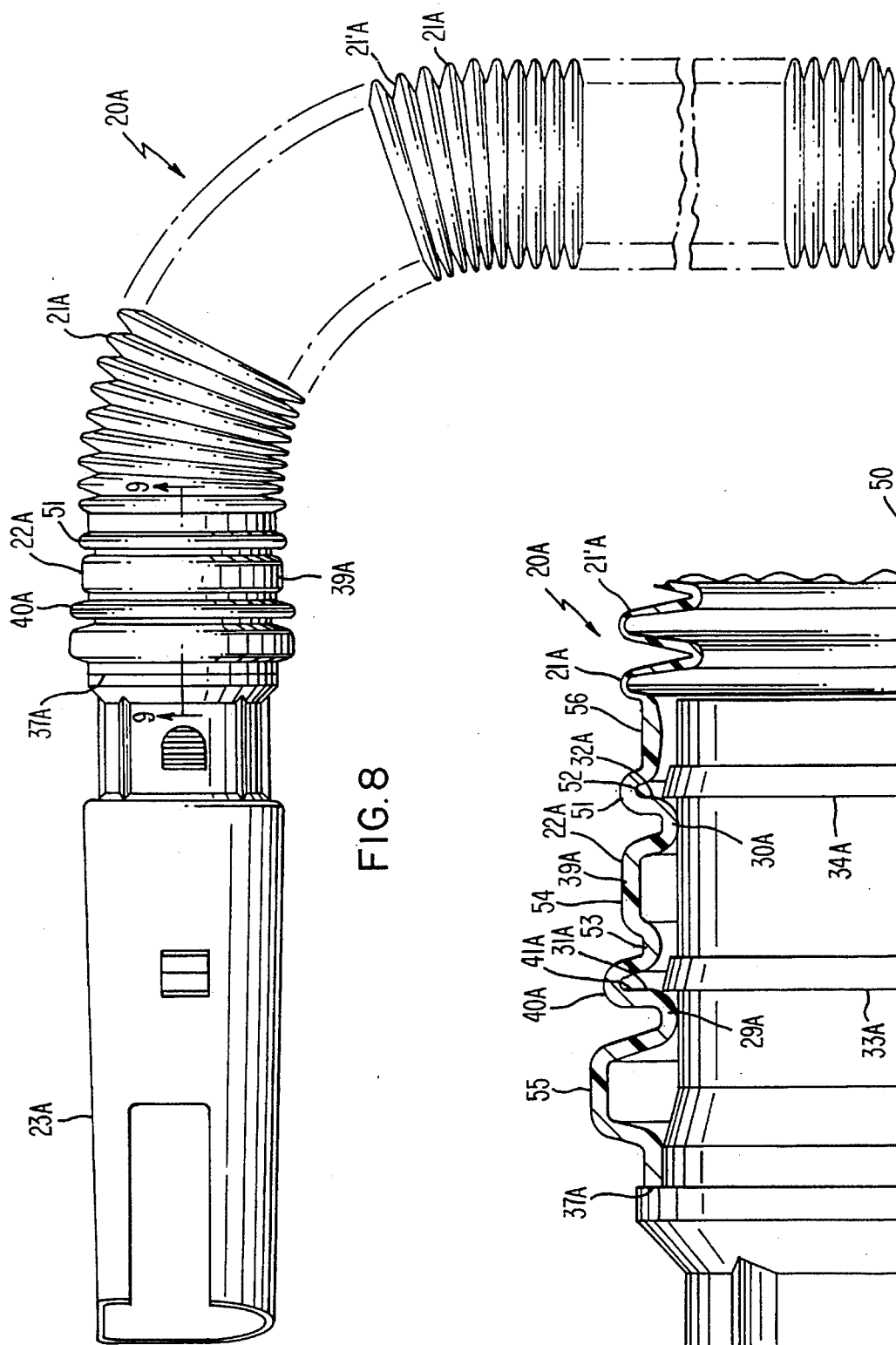
FIG. 8 is a view similar to FIG. 1 and illustrates the new vacuum cleaner hose assembly of this invention.
FIG. 9 is an enlarged fragmentary cross-sectional view taken on line 9—9 of FIG. 8.
Figure 10:
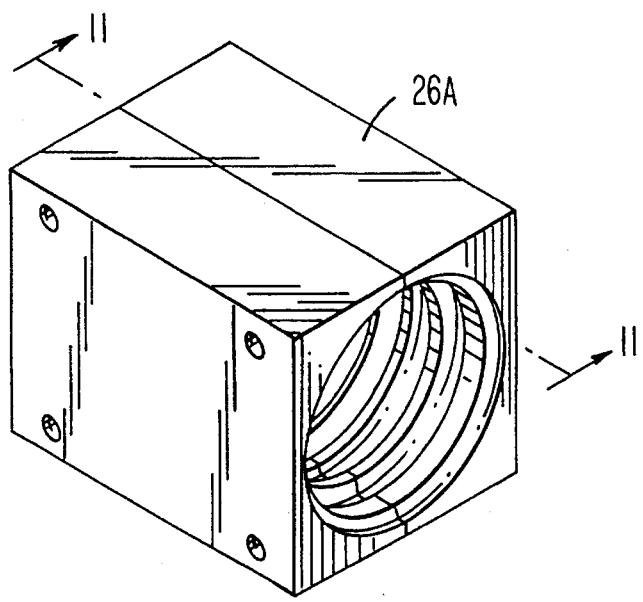
FIG. 10 is a reduced perspective view illustrating a cuff block for forming the cuff end of the new flexible vacuum cleaner hose of the vacuum cleaner hose assembly of FIG. 8.
Figure 14:
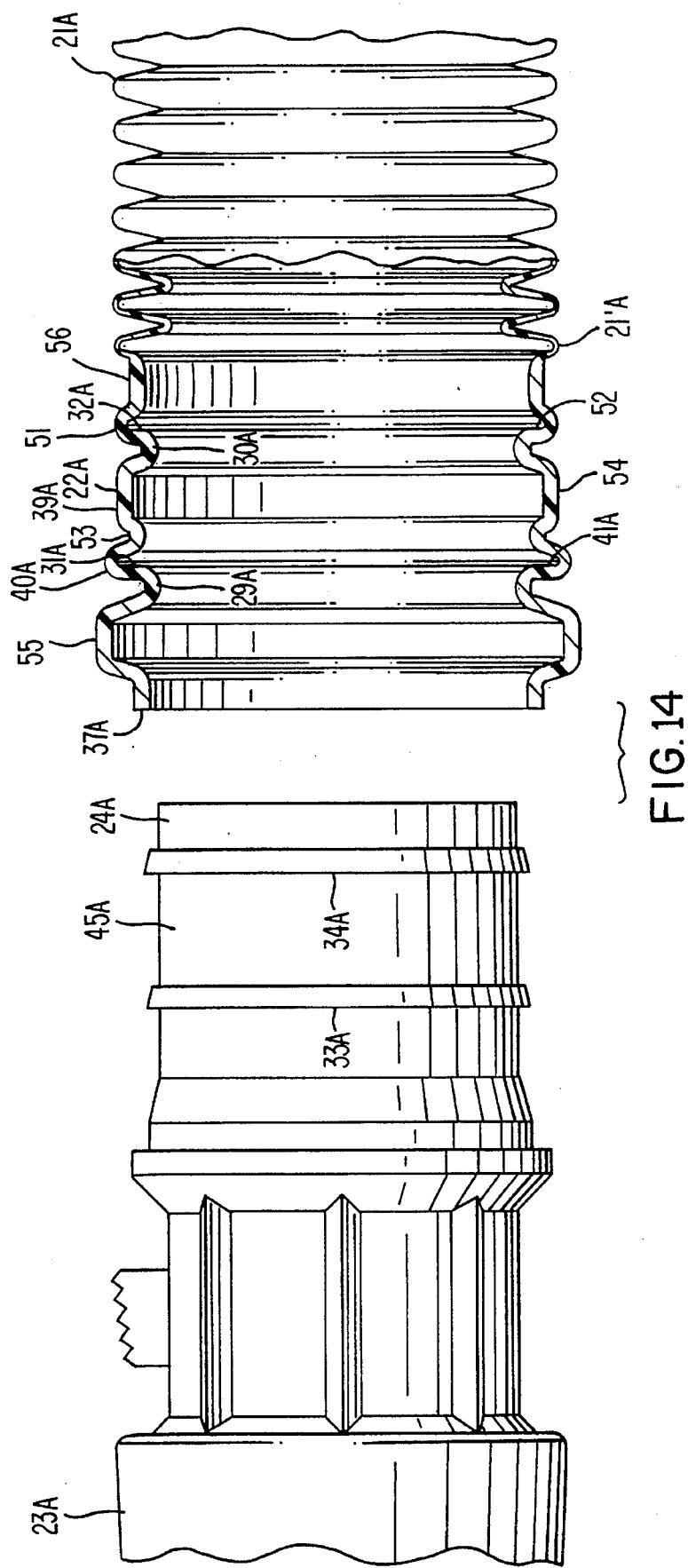
FIG. 14 is a fragmentary view illustrating the parts of the new vacuum cleaner hose assembly of this invention of FIGS. 8 and 9 in their separated condition, the vacuum cleaner hose being shown in cross section and the tool part being shown in elevation.

As illustrated in FIGS. 8, 9 and 14, the tool part 23A is identical to the tool part 23 previously described and the flexible hose 21A has the annular corrugations 21'A formed in the same manner as the corrugations 21' previously described. However, each cuff end 22A of the flexible hose 21A of this invention has the annular structure 39A thereof that interconnects the locking inwardly directed annular convolutions 29A and 30A thereof annularly spaced outwardly from the surface means 45A of the end 24A of the tool part 23A to prevent drag thereon during rotation of the tool part 23A relative to the cuff end 22A. In this manner, the tool part 23A can be rotated relative to the hose 21A for its intended purpose, such as for permitting the flexible hose 21A to rotate relative to the vacuum cleaner housing without drag during a floor sweeping operation.

The inwardly directed annular convolutions 29A and 30A of the cuff end 22A of the hose 21A respectively have their like facing sides 31A and 32A disposed substantially transverse to the longitudinal axis of the flexible hose 21A that is represented by the reference numeral 50 in FIG. 9.

The annular structure 39A of the cuff end 22A of the flexible hose 21A of this invention comprises a pair of axially spaced and outwardly directed convolutions 40A and 51 provided with like facing sides 41A and 52 that respectively join with the like facing sides 31A and 32A of the pair of inwardly directed annular convolutions 29A and 30A. The annular structure 39A of the cuff end 22A of the hose 21A not only comprises the pair of outwardly directed annular convolutions 40A and 51, but also comprises a set of one inwardly directed annular convolution 53 and one outwardly directed annular convolution 54 disposed in series between the one outwardly directed annular convolution 40A and the one inwardly directed convolution 30A as illustrated. In addition, the cuff end 22A has an outwardly directed annular convolution 55 that is adjacent the end edge 37A thereof and another inwardly directed annular convolution 56 that joins with the annular convolutions 21'A of the flexible hose 21A as illustrated, the convolutions 55 and 56 also being shaped differently than similar convolutions on the cuff end 22 of the flexible hose 21.

It is believed that by forming the annular structure 39A of the cuff end 22A of the flexible hose 21A of this invention in the above manner, not only is good locking provided by the surfaces 31A and 32A of the convolutions 29A and 30A with the annular shoulders 33A and 34A of the end 24A of the tool part 23A, but also no drag is provided by the annular structure 39A of the cuff end 22A with the surface 45A of the end 24A of the tool part 23A during rotational movement of the tool part 23A relative thereto for the reasons previously set forth. As can be seen in FIG. 9, the inwardly directed convolutions 29A and 30A are transversely intermediate of the convolutions 55 and 56. The locking surfaces 31A and 32A of these convolutions provide the only drag between the cuff end annular structure of the hose and the tool part, by virtue of the contact between these locking surfaces and the shoulders 33A and 34A of the total part.

Figure 11:
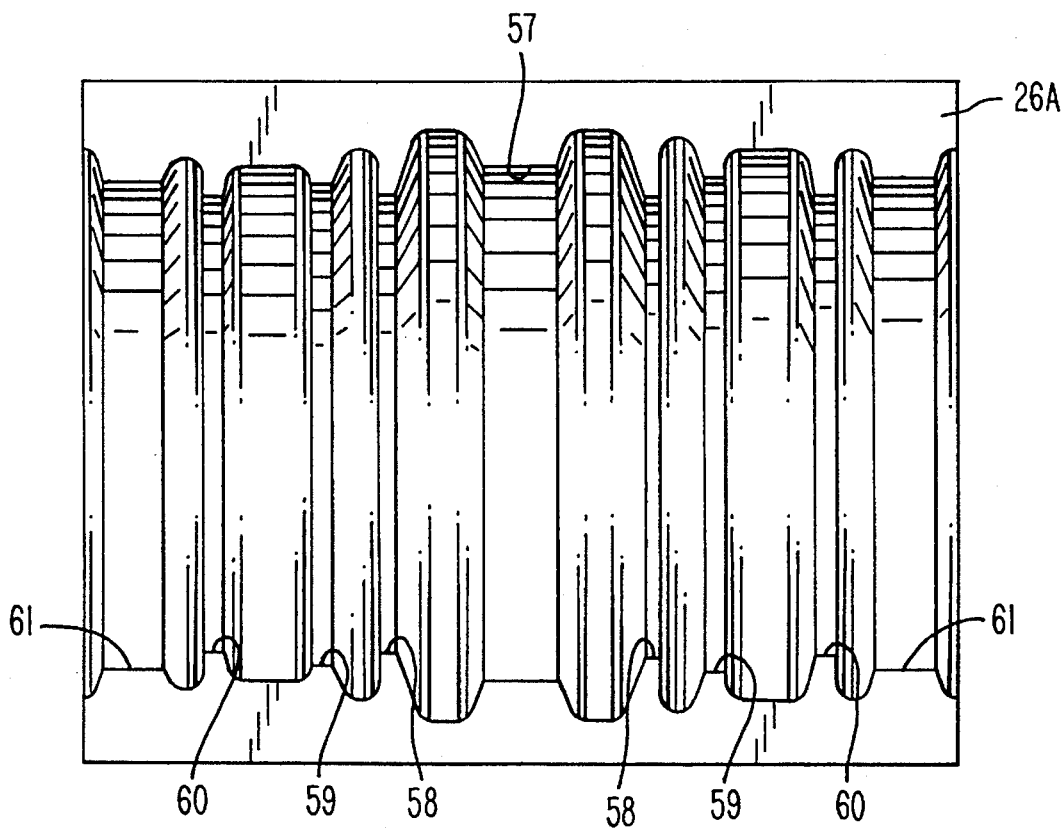
FIG. 11 is an enlarged cross sectional-view taken one line 11—11 of FIG. 10.
Figure 12:
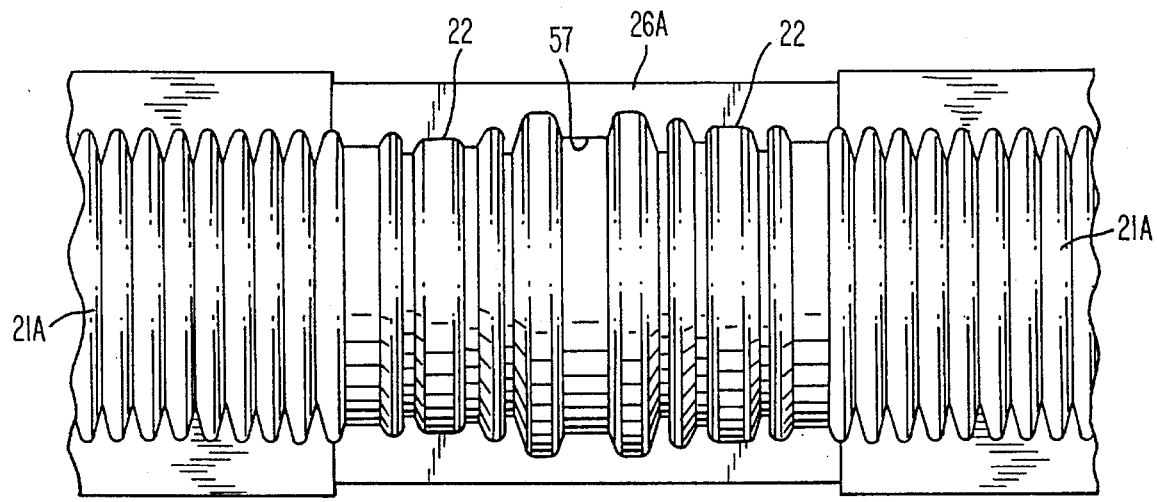
FIG. 12 is a reduced cross sectional-view similar to FIG. 11 and illustrates the cuff block in its assembled relation with stretch hose blocks on each side thereof for forming the flexible vacuum cleaner hose of FIGS. 8 and 9, FIG. 12 illustrating in elevation the mold material that has been extruded into the die blocks of FIG. 12 and that forms a blow molded flexible hose structure.
Figure 13:
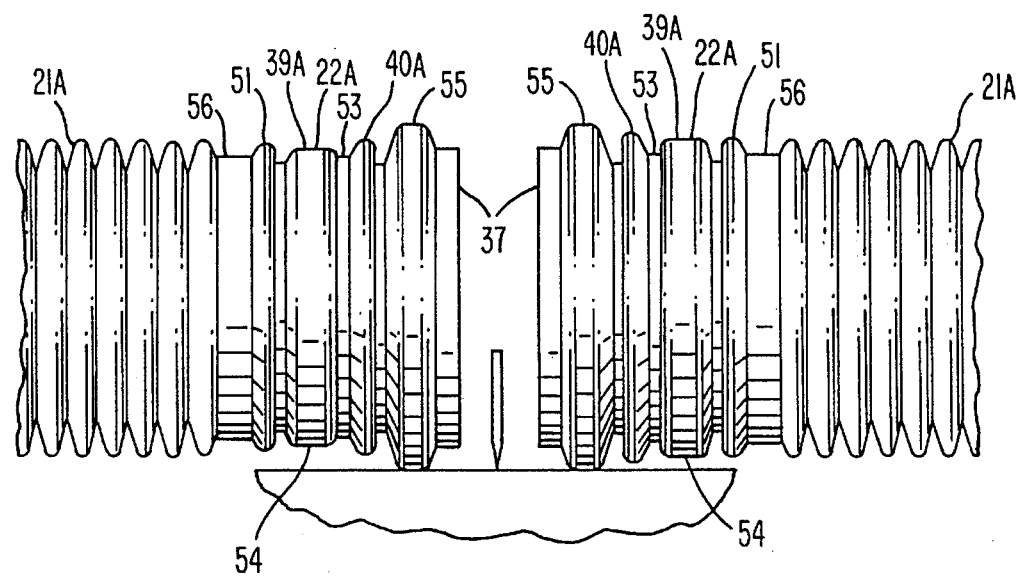
FIG. 13 is a view similar to FIG. 12 and illustrates how the blow molded flexible vacuum cleaner hose structure formed with the blocks of FIG. 12 has been subsequently removed therefrom and is cut to form two separate flexible vacuum cleaner hoses of this invention.

While the cuff end 22A of the flexible hose 21A of this invention can have any suitable dimensions, one working embodiment of the annular surfaces 57, 58, 59, 60 and 61 of the die block 26A of this invention that is illustrated in FIG. 11 respectively have diameters of approximately 1,500 inches, 1.348 inches, 1.440 inches, 1.346 inches and 1.450 inches while the outside diameter of the convolutions 21'A of the hose 21A are approximately 1.600 inches.

Therefore, it can be seen that this invention not only provides a new vacuum cleaner hose assembly and a new flexible vacuum cleaner hose therefor, but also this invention provides a new method of making such a vacuum cleaner hose assembly and a new method of making such a flexible vacuum cleaner hose.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a vacuum cleaner hose assembly comprising a flexible hose with annular corrugations having a cuff end, and a tubular tool part having an end telescoped in said cuff end and being locked therein while being rotatable relative thereto, said cuff end having a first outwardly directed annular convolution adjacent said end of said tool part and a first inwardly directed annular convolution joining said annular corrugations, said cuff end also having a pair of axially spaced apart and inwardly directed annular convolutions provided with like facing sides, said end of said tool part having a pair of axially spaced apart and outwardly directed annular shoulder means respectively engaging said sides of said pair of annular convolutions to tend to lock said end of said tool part in said cuff end of said hose, said cuff end of said hose having an annular structure interconnecting said pair of convolutions together, the improvement wherein said pair of convolutions are transversely intermediate said first outwardly directed convolution and said first inwardly directed convolution, said pair of convolutions providing the only contact between said annular structure and said tool part, and wherein said annular structure of said cuff end of said hose is annularly spaced outwardly form said tool part so as to be out of engagement therewith from one said pair of convolutions to the other of said pair of convolutions to minimize drag during rotation of said tool part relative to said cuff end.

2. A vacuum cleaner hose assembly as set forth in claim 1 wherein said cuff end of said hose has a pair of axially spaced apart and outwardly directed convolutions provided with like facing sides that respectively join with said like facing sides of said pair of inwardly directed annular convolutions, said annular structure of said cuff end of said hose comprising said pair of outwardly directed annular convolutions and a set of one inwardly directed annular convolution and one outwardly directed annular convolution disposed in series between one of said pair of outwardly directed annular convolutions and one of said pair of inwardly directed annular convolutions.

3. A vacuum cleaner hose assembly as set forth in claim 2 wherein said one outwardly directed annular convolution of said set has an apex that has a substantially long and flat transverse cross-sectional configuration.

4. In a flexible vacuum cleaner hose with annular corrugations having a cuff end for telescopically receiving a tubular tool part having an end therein so as to be locked therein while being rotatable relative thereto, said cuff end having a first outwardly directed annular convolution adjacent said end of said tool part and a first inwardly directed annular convolution joining said annular corrugations, said cuff end also having a pair of axially spaced apart and inwardly directed annular convolutions provided with like facing sides, said end of said tool part having a pair of axially spaced apart outwardly directed annular shoulder means respectively engaging said sides of said pair of annular convolutions to tend to lock said end of said tool part in said cuff end of said hose, said cuff end of said hose having an annular structure interconnecting said pair of convolutions together, the improvement wherein said pair of convolutions are transversely intermediate said first outwardly directed convolution and said first inwardly directed convolution, said pair of convolutions constructed to provide the only contact between said annular structure and said tool part and wherein said annular structure of said cuff end of said hose is constructed to be annularly spaced outwardly from said tool part so as to be out of engagement therewith from one of said pair of convolutions to the other of said pair of convolutions to minimize drag during rotation of said tool part relative to said cuff end.

5. A flexible vacuum cleaner hose assembly as set forth in claim 4 wherein said cuff end of said hose has a pair of axially spaced apart and outwardly directed convolutions provided with like facing sides that respectively join with said like facing sides of said pair of inwardly directed annular convolutions, said annular structure of said cuff end of said hose comprising said pair of outwardly directed annular convolutions and a set of one inwardly directed annular convolution and one outwardly directed annular convolution disposed in series between one of said pair of outwardly directed annular convolutions and one of said pair of inwardly directed annular convolutions.

6. A flexible vacuum cleaner hose assembly as set forth in claim 5 wherein said one outwardly directed annular convolution of said set has an apex that has a substantially long and flat transverse cross-sectional configuration.

7. In a method of making a vacuum cleaner hose assembly comprising a flexible hose with annular corrugations having a cuff end, and a tubular tool part having an end telescoped in said cuff end and being locked therein while being rotatable relative thereto, said cuff end having a first outwardly directed annular convolution adjacent said end of said tool part and a first inwardly directed annular convolution joining said annular corrugations, said cuff end also having a pair of axially spaced apart and inwardly directed annular convolutions provided with like facing sides, said end of said tool part having a pair of axially spaced apart and outwardly directed annular shoulder means respectively engaging said sides of said pair of annular convolutions to tend to lock said end of said tool part in said cuff end of said hose, said cuff end of said hose having an annular structure interconnecting said pair of convolutions together, the improvement comprising the step of placing said pair of convolutions transversely intermediate said first outwardly directed convolution and said first inwardly directed convolution, utilizing said pair of convolutions to provide the only contact between said annular structure and said tool part, and forming said annular structure of said cuff end of said hose to be annularly spaced outwardly from said tool part so as to be out of engagement therewith from one of said pair of convolutions to the other of said pair of convolutions to minimize drag during rotation of said tool part relative to said cuff end.

8. A method of making a vacuum cleaner hose assembly as set forth in claim 7 and comprising the steps of forming said cuff end of said hose to have a pair of axially spaced apart and outwardly directed convolutions provided with like facing sides that respectively join with said like facing sides of said pair of inwardly directed annular convolutions, and forming said annular structure of said cuff end of said hose to comprise said pair of outwardly directed annular convolutions and a set of one inwardly directed annular convolution and one outwardly directed annular convolution disposed in series between one of said pair of outwardly directed annular convolutions and one of said pair of inwardly directed annular convolutions.

9. A method of making a vacuum cleaner hose assembly as set forth in claim 8 and comprising the step of forming said one outwardly directed annular convolution of said set to have an apex that has a substantially long and flat transverse cross-sectional configuration.

10. In a method of making a flexible vacuum cleaner hose with annular corrugations having a cuff end for telescopically receiving a tubular tool part having an end therein so as to be locked therein while being rotatable relative thereto, said cuff end having a first outwardly directed annular convolution adjacent said end of said tool part and a first inwardly directed annular convolution joining said annular corrugations, said cuff end also having a pair of axially spaced apart and inwardly directed annular convolutions provided with like facing sides, said end of said tool part having a pair of axially spaced apart and outwardly directed annular shoulder means respectively engaging said sides of said pair of annular convolutions to tend to lock said end of said tool part in said cuff end of said hose, said cuff end of said hose having an annular structure interconnecting said pair of convolutions together, the improvement comprising the step of placing said pair of convolutions transversely intermediate said first outwardly directed convolution and said first inwardly directed convolution, providing said pair of convolutions so as to be constructed as the only contact between said annular structure and said tool part, and forming said annular structure of said cuff end of said hose so as to be constructed to be annularly spaced outwardly from said tool part so as to be out of engagement therewith from one of said pair of convolutions to the other of said pair of convolutions to minimize drag during rotation of said tool part relative to said cuff end.

11. A method of making a flexible vacuum cleaner hose assembly as set forth in claim 10 and comprising the steps of forming said cuff end of said hose to have a pair of axially spaced apart and outwardly directed convolutions provided with like facing sides that respectively join with said like facing sides of said pair of inwardly directed annular convolutions, and forming said annular structure of said cuff end of said hose to comprise said pair of outwardly directed annular convolutions and a set of one inwardly directed annular convolution and one outwardly directed annular convolution disposed in series between one of said pair of outwardly directed annular convolutions and one of said pair of inwardly directed annular convolutions.

12. A method of making a flexible vacuum cleaner hose assembly as set forth in claim 11 and comprising the step of forming said one outwardly directed annular convolution of said set to have an apex that has a substantially long and flat transverse cross-sectional configuration.

* * * * *